US006421537B1

(12) United States Patent
Lamb et al.

(10) Patent No.: US 6,421,537 B1
(45) Date of Patent: *Jul. 16, 2002

(54) METHOD AND APPARATUS FOR PROVIDING SWITCH CAPABILITY MEDIATION IN A MOBILE TELEPHONE SYSTEM

(75) Inventors: James A. Lamb, Elkhorn; Pamela J. Jacobs, Omaha, both of NE (US)

(73) Assignee: Compaq Computer Corp., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/387,168

(22) Filed: Aug. 31, 1999

Related U.S. Application Data

(63) Continuation of application No. 08/781,262, filed on Jan. 11, 1997, now Pat. No. 6,026,298.

(51) Int. Cl.[7] .................................................. H04Q 7/22
(52) U.S. Cl. ........................ 455/433; 455/424; 455/445
(58) Field of Search ................................ 455/433, 461, 455/462, 422, 466, 414, 435, 417, 445, 424

(56) References Cited

U.S. PATENT DOCUMENTS

| 4,930,150 A | 5/1990 | Katz | ........................... 379/93 |
| 5,014,298 A | 5/1991 | Katz | ........................... 379/93 |
| 5,048,075 A | 9/1991 | Katz | ........................... 379/92 |

(List continued on next page.)

FOREIGN PATENT DOCUMENTS

| DE | 196 17 798 A1 | 11/1997 | |
| EP | WO 93 11646 A | 6/1993 | ............ H04Q/7/04 |
| EP | 0604911 A | 7/1994 | |

(List continued on next page.)

OTHER PUBLICATIONS

Holley, K.A., "Global System For Mobile Communications—What's In Store?", published by BT Technology Journal, vol. 14, No. 3, Jul. 1, 1996, pp. 47–54.

Mohan S., "Network Impacts of Privacy and Authentication Protocols for PCS", IEEE, Proceedings of the Conference on Communications, Jun. 18–22, 1995, vol. 3, pp. 1557–1561, Seattle, WA.

(List continued on next page.)

Primary Examiner—Dwayne Bost
Assistant Examiner—Miguel D. Green
(74) Attorney, Agent, or Firm—Fenwick & West LLP

(57) ABSTRACT

An improved home location register (HLR) that includes a switch capability mediation module for implementing switch capability mediation between different mobile switching centers (MSCs). According to the invention, when one MSC (home MSC of a receiving party) attempts to communicate with another MSC (serving MSC) via the HLR serving the home MSC, the mediation module determines whether the two MSCs are provided by different vendors and whether they implement different capabilities, based on the MPCM (MSC ID Point Code Map) file records of both the originating and serving MSCs. The MPCM files store MSCs' network configuration information. For each capability involved, the mediation module determines which one of the three situations are present: (1) the originating MSC has this particular capability, but the serving MSC does not; (2) the originating MSC does not have this capability, but the serving MSC does; and (3) both the originating and serving MSCs have this capability but implement it in different ways. Depending on which situation is present, the mediation module provides appropriate capability mediation between the two MSCs. In any of the above three situations, if the mediation module determines that it cannot mediate between the two different MSCs, based on the particular capability involved, it may deny the call entirely. Thus, by using the improved HLR of the invention, the communication between two different MSCs may be properly established and optimized.

17 Claims, 6 Drawing Sheets

U.S. PATENT DOCUMENTS

| | | | |
|---|---|---|---|
| 5,077,790 A | 12/1991 | D'Amico et al. | 380/23 |
| 5,091,942 A | 2/1992 | Dent | 380/46 |
| 5,128,984 A | 7/1992 | Katz | 379/92 |
| 5,153,902 A | 10/1992 | Buhl et al. | 379/57 |
| 5,204,902 A | 4/1993 | Reeds, III et al. | 380/23 |
| 5,210,787 A | 5/1993 | Hayes et al. | 455/432 X |
| 5,237,612 A | 8/1993 | Raith | 380/23 |
| 5,243,645 A | 9/1993 | Bissell et al. | 379/211 |
| 5,282,250 A | 1/1994 | Dent et al. | 380/23 |
| 5,309,501 A | 5/1994 | Kozik et al. | 379/58 |
| 5,329,578 A | 7/1994 | Brennan et al. | 379/67 |
| 5,371,781 A | 12/1994 | Ardon | 379/59 |
| 5,418,835 A | 5/1995 | Frohman et al. | 455/413 |
| 5,448,622 A | 9/1995 | Huttunen | 455/567 X |
| 5,497,412 A | 3/1996 | Lannen et al. | 379/60 |
| 5,504,804 A | 4/1996 | Widmark et al. | |
| 5,513,245 A | 4/1996 | Mizikovsky et al. | 379/59 |
| 5,524,135 A | 6/1996 | Mizikovsky et al. | 379/58 |
| 5,530,736 A | 6/1996 | Comer et al. | 45/567 X |
| 5,537,474 A | 7/1996 | Brown et al. | 380/23 |
| 5,551,073 A | 8/1996 | Sammarco | 455/89 |
| 5,553,120 A | 9/1996 | Katz | 379/88 |
| 5,590,175 A | 12/1996 | Gallant et al. | 379/58 |
| 5,592,541 A | 1/1997 | Fleischer, III et al. | 379/211 |
| 5,594,740 A | 1/1997 | LaDue | 379/59 |
| 5,600,704 A | 2/1997 | Ahlberg et al. | 379/58 |
| 5,603,081 A | 2/1997 | Raith et al. | 455/33.1 |
| 5,615,267 A | 3/1997 | Lin et al. | 380/23 |
| 5,642,401 A | 6/1997 | Yahagi | 379/58 |
| 5,668,875 A | 9/1997 | Brown et al. | 380/23 |
| 5,673,308 A | 9/1997 | Akhavan | 455/417 |
| 5,708,710 A | 1/1998 | Duda | 380/21 |
| 5,724,417 A | 3/1998 | Bartholomew et al. | 379/211 |
| 5,727,057 A | 3/1998 | Emery et al. | 455/456 |
| 5,737,701 A | 4/1998 | Rosenthal et al. | 455/411 |
| 5,754,952 A | 5/1998 | Hodges et al. | 455/411 |
| 5,754,955 A | 5/1998 | Ekbatani | 455/422 |
| 5,761,500 A | 6/1998 | Gallant et al. | 395/610 |
| 5,793,859 A | 8/1998 | Mattews | 455/417 X |
| 5,794,139 A | 8/1998 | Mizikovsky et al. | 455/403 |
| 5,918,177 A * | 6/1999 | Corriveau et al. | 455/414 |
| 6,026,298 A * | 2/2000 | Lamb et al. | 455/433 |
| 6,032,043 A * | 2/2000 | Houde | 455/433 |
| 6,101,392 A * | 8/2000 | Corriveau | 455/458 |
| 6,122,510 A * | 9/2000 | Granberg | 455/432 |
| 6,134,433 A * | 10/2000 | Joong et al. | 455/417 |
| 6,295,447 B1 * | 9/2001 | Reichelt et al. | 455/406 |

FOREIGN PATENT DOCUMENTS

| | | |
|---|---|---|
| EP | 0 613 280 A1 | 8/1994 |
| EP | 0690648 A2 | 1/1996 |
| EP | 0 715 475 A2 | 6/1996 |
| EP | 0 738 095 A2 | 10/1996 |
| WO | WO 93/21715 | 10/1993 |
| WO | WO 94/06236 | 3/1994 |
| WO | 94 29992 | 12/1994 |
| WO | WO 96/07286 | 3/1996 |
| WO | WO 97/01231 | 1/1997 |
| WO | 98 05173 A | 2/1998 |
| WO | Wo 98/26620 | 6/1998 |

OTHER PUBLICATIONS

Article by Wey, Jyhi–Kong et al., "Clone Terminator: An Authentication Service for Advanced Mobile Phone System," Institute of Electrical and Electronics Engineers Conference: Vehicular Technology, Chicago, Jul. 25–28, 1995, vol. 1, No. Conf. 45, Jul. 25, 1995, pp. 175–179.

L. Rydin, et al., "Network and Service Evolution in Fixed and Mobile Networks" proceedings of the International Switching Symposium, Yokohama, Oct. 25–30, 1992, vol. 1, No. SYMP. 14, Oct. 25, 1992, pp. 54–58, Institute of Electronics; Information and Communication Engineers.

Eleftheriadis G. P., et al. "User Profile Identification In Future Mobile Telecommunications Systems" IEEE Network: The Magazine Of Computer Communications; vol. 8, No. 5 Sep. 1994, pp. 33–39.

"Find Me NOW," *Cellular One Service Guide*, Apr. 1994, pp. 1–8.

Article by Kaczmarek, Keith W., "Cellular Networking: A Carrier's Perspective," Institute of Electrical and Electronics Engineers Conference: Gateway to New Concepts in Vehicular Technology, San Francisco, May 1–3, 1989, vol. 1, No. Conf. 39, May 1, 1989, pp. 1–6.

* cited by examiner

METHOD AND APPARATUS FOR PROVIDING SWITCH CAPABILITY MEDIATION IN A MOBILE TELEPHONE SYSTEM

RELATED APPLICATIONS

This application is a continuation of U.S. Ser. No. 08/781,262, now U.S. Pat. No. 6,026,298, filed on Jan. 11, 1997, the contents of which are hereby incorporated by reference. The following applications are related to the subject application. Each of the following applications is incorporated by reference herein:

The following applications are related to the subject application. Each of the following applications is incorporated by reference herein.

1. U.S. application Ser. No. 08/781,264 entitled "Method and Apparatus for Providing Fraud Protection Mediation in a Mobile Telephone System," of Lamb, filed Jan. 11, 1997 now U.S. Pat. No. 6,085,083;

2. U.S. application Ser. No. 08/781,259 entitled "Method and Apparatus for Implementing Alias Mobile ID Numbers in a Mobile Telephone System," of Lamb, filed Jan. 11, 1997 now abandoned;

3. U.S. application Ser. No. 08/781,261 entitled "Method and Apparatus for Implementing Configurable Call Forwarding Bins in a Mobile Telephone System," of Lamb, filed Jan. 11, 1997 now U.S. Pat. No. 6,157,831;

4. U.S. application Ser. No. 08/781,260 entitled "Method and Apparatus for Method and Apparatus For Automated Updates on an A-Key Entry In a Mobile Telephone System," of Jacobs, filed Jan. 11, 1997 now abandoned;

5. U.S. application Ser. No. 08/780,830 entitled "Method and Apparatus for Configuration of Authentication Center Operations Allowed by MSCID in a Mobile Telephone System," of Jacobs et al., filed Jan. 11, 1997 now abandoned;

6. U.S. application Ser. No. 08/781,258 entitled "Method and Apparatus for Configuration of Authentication Center Operations Allowed by System Access Type in a Mobile Telephone System," of Jacobs, filed Jan. 11, 1997 now abandoned;

7. U.S. application Ser. No. 08/781,263 entitled "Method and Apparatus for Authentication Directive initiation Limits in a Mobile Telephone System," of Jacobs, filed Jan. 11, 1997 now abandoned.

BACKGROUND OF THE INVENTION

The invention generally relates to a wireless communication network, and more particularly, relates to an improved home location register (HLR) that provides switch capability mediation between different mobile switching centers (MSCs) in a wireless communication network.

Wireless communication is one of the fastest growing segments of the telecommunication industry. With the mobility of the wireless devices, such as cellular phones and pagers, a subscriber to a wireless service can make or receive a call or receive a message without being restricted to any particular location. Because of the convenience provided by wireless devices, they have been widely used by average consumers.

Wireless communications are provided through a wireless communication network, which can be realized, for example, as a Signaling System 7 (SS7) network. The SS7 network uses the EIA/TIA Interim Standard 41 (IS-41) protocol, which is the standard commonly used in North America. A description of the SS7 network and the IS-41 protocol can be found in Signaling System #7, by Travis Russell, and The Mobile Communications Handbook, by Jerry Gibson, which are hereby incorporated by reference.

The SS7 network is used for switching data messages pertaining to connecting telephone calls and for maintaining the signaling network As shown in FIG. 1, the SS7 network 100 has three different types of nodes or signaling points: Service Switching Point (SSP) 112, Signal Transfer Point (STP) 116, and Service Control Point (SCP) 122.

An SSP 112 is an local exchange in the telephone network. An SSP 112 uses the information provided by the calling party (such as dialed digits) and determines how to connect the call. An STP 116 serves as a router in the SS7 network and switches SS7 messages as received from the various SSPs 112 through the network to their appropriate destinations. An STP 116 receives messages in packet form from an SSP 112. These packets are either related to call connections or database queries for an SCP 122. If the packet is a request from an SSP 112 to connect a call, the message must be forwarded to the destination where the call will be terminated. The destination is determined by the dialed digits. If the message is a database query seeking additional information regarding a person who subscribes a wireless service, i.e., a "subscriber", the destination will be a database. Access to telephone company databases is provided through an SCP 122. These databases are used to store information about subscribers' services, calling card validation, fraud protection, etc.

As shown in FIG. 1, the wireless network is shared by multiple regions 126, such as regions A and B. In each region 126, an SCP 122 is provided. Each region 126 is further divided into a number of registration areas 132, each of which is served by a Mobile Switching Center (MSC) 136. An MSC 136 provides wireless communication services to all properly registered cellular phones 142 in the registration area.

As illustrated in FIG. 1, an SCP 122 contains an authentication center (AC) 146 and a home location registers (HLR) 152. AC 146 authenticates a subscriber's cellular phone through the use of an encrypted number called the A-Key. HLR 152 is used to store information regarding cellular subscribers in the region for which it provides services. HLR 152 also stores information identifying the services allowed for each subscriber. In addition to these, HLR 152 stores the current locations of cellular phones 142 of those subscribers who initially activated their cellular phones through a wireless service provider in the region the HLR serves. This region is also referred to as the "home area" of those subscribers. Although not shown, a backup HLR is also provided in SCP 122.

A visitor location register (VLR) 156 is also provided in each region 126. VLR 156 is used when a cellular phone 142 is not recognized by a local MSC. VLR 156 stores the current locations for the visiting subscribers.

Typically, in conventional wireless communication network, the MSCs in regions A and B may be provided by different vendors, e.g., AT&T, Ericsson, Motorola, or Northern Telecom, etc. These different MSC vendors implement the capabilities of their MSCs in different ways. Furthermore, the MSCs provided by some vendors, such as Northern Telecom, may have proprietary features not included in other vendors' MSCs. Even the MSCs provided by the same vendors may implement different revisions of IS-41, e.g, IS-41 Rev A, IS-41 Rev B, etc. Thus, it may present a problem when a subscriber travels from his home area where he initially activated his cellular phone to a roaming area, such as from region A to region B in FIG. 1. If a call origination request is received by an MSC in region A, i.e., the home area of the subscriber's cellular phone and this MSC attempts to communicate with the MSC currently serving the subscriber in region B, there may be difficulties in connecting the call if the two MSCs implement different capabilities. The call may not even be deliverable to the subscriber currently in region B. This would create a serious problem for the subscriber since he may not have expected that the communication cannot go through as intended when he is in region B. Conventional HLRs provide minimum support between various kinds of MSCs.

Accordingly, there is a need for an improved HLR that can provide switch capability mediation between two MSCs implementing different capabilities so that the communication between the two MSCs may be optimized.

SUMMARY OF THE INVENTION

The present invention provides an improved HLR that includes a switch capability mediation module for implementing switch capability mediation between different mobile switching centers (MSCs). According to the invention, when one MSC (e.g. an MSC in the home area of a receiving party, i.e. home MSC) attempts to communicate with another MSC (serving MSC) via the HLR serving the home MSC, a mediation module in the HLR determines whether the two MSCs are provided by different vendors and whether they implement different capabilities, based on the MPCM (MSC ID Point Code Map) file records of both the originating and serving MSCs in an MPCM file in the HLR. The MPCM file stores the MSCs' network configuration information. For each capability involved, the mediation module determines which one of the three situations are present: (1) the originating MSC has this particular capability, but the serving MSC does not; (2) the originating MSC does not have this capability, but the serving MSC does; and (3) both the originating and serving MSCs have this capability but implement it in different ways. If situation 1 is present, the mediation module may simply pass along the parameters associated with the particular capability to the serving MSC to let the serving MSC at least try to use this capability. If situation 2 is present, the mediation module may include predefined parameters associated with the particular capability in the routing message to the serving MSC so that this particular capability of the serving MSC may be utilized. Finally, if situation 3 is present, the mediation module will attempt to make appropriate changes to the parameters relating to the particular capability of the originating MSC to those suitable to the serving MSC and then forward the modified parameters in a routing message to the serving MSC. In any of the above three situations, if the mediation module determines that it cannot mediate between the two different MSCs, based on the particular capability involved, it may deny the call entirely. Thus, by using the improved HLR of the invention, the communication between two different MSCs may be properly established and optimized.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Figure 2:
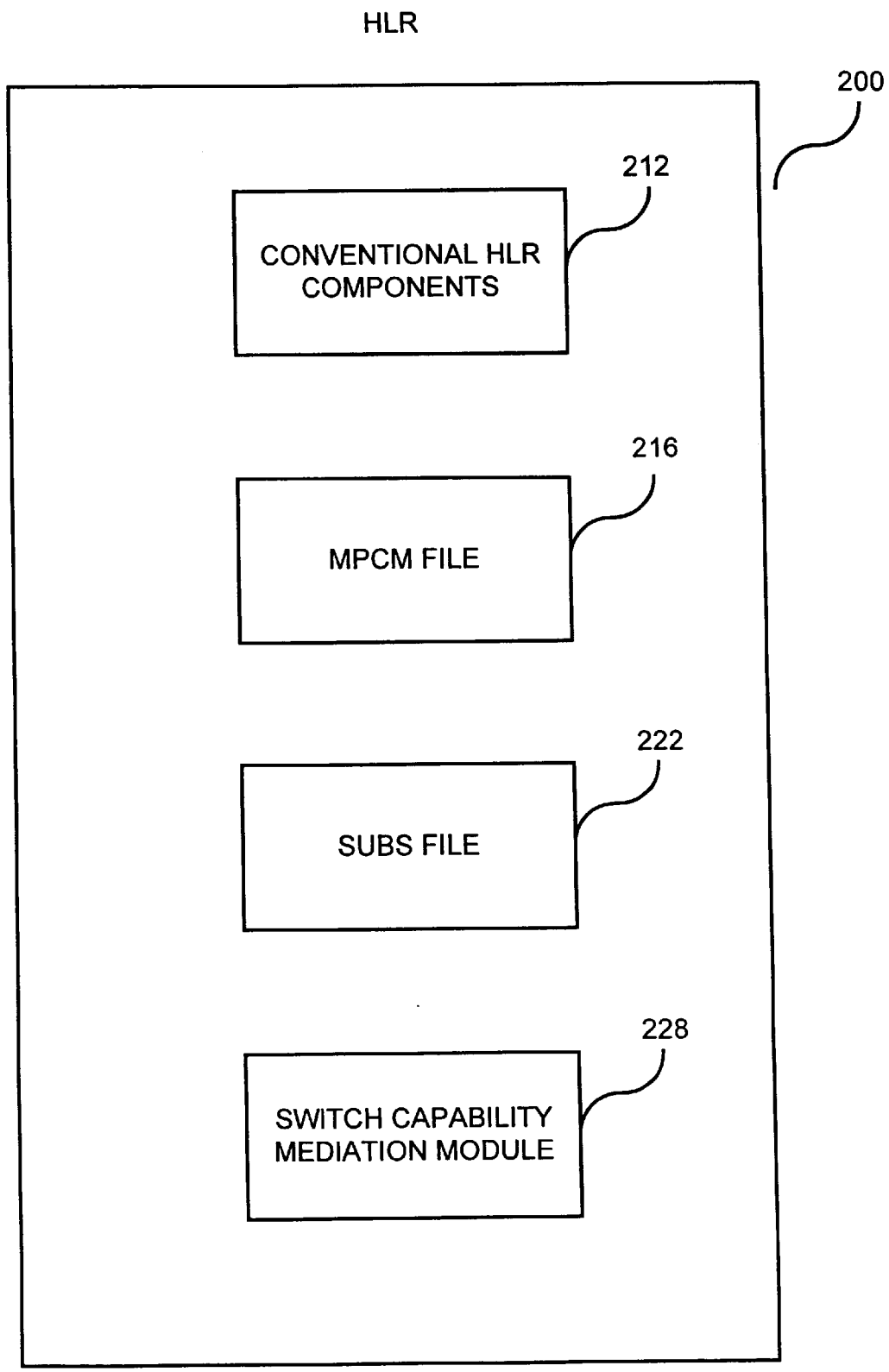
FIG. 2 shows an example of an HLR according to the invention.

FIG. 2 shows home location register (HLR) 200 according to the invention. As shown, HLR 200 includes at least conventional HLR components 212, MPCM file 216, SUBS file 222 and switch capability mediation module 228.

MPCM file 216 is the "MSC ID Point Code Map File" which store MSCs' network configuration information. Each MSC communicating to an HLR has a corresponding MPCM file record in the MPCM file of the HLR. SUBS file 222 is the "subscribers' files" which store subscribers' profiles on a per subscriber basis (i.e, information for each cellular phone). Usually one SUBS file in the HLR contains information about all of its home subscribers (i.e., the subscribers who initially activated their cellular phones in the region the HLR serves). Switch capability mediation module 228 is an application software program for providing capability mediation between MSCs provided by different vendors or implementing different capabilities. It will be understood by persons of ordinary skill in the art that functions performed by the HLR are implemented by a processor 123 executing computer instructions stored in a memory 201.

Figure 3:
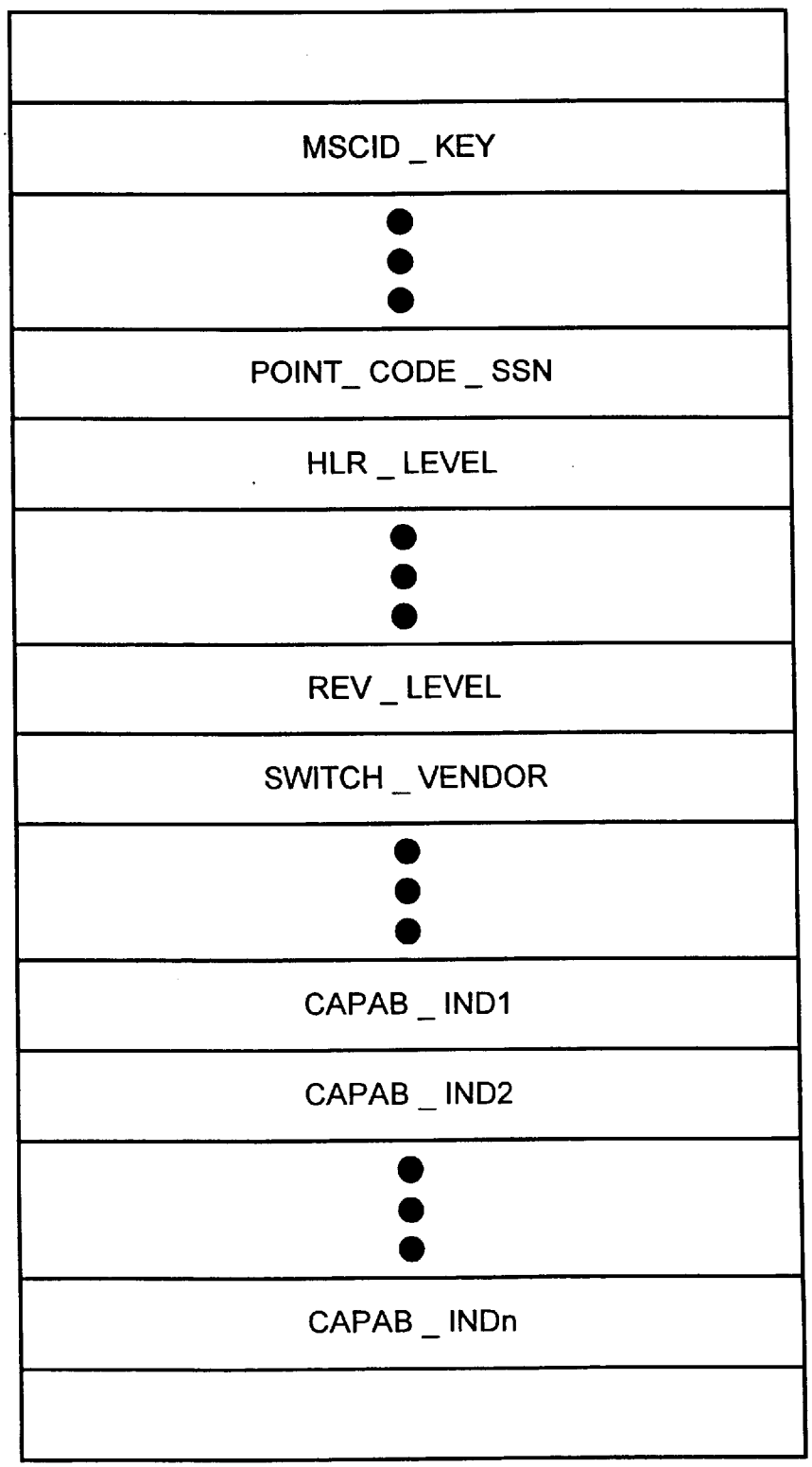
FIG. 3 shows an MPCM file record of an MSC according to the invention.

FIG. 3 illustrates a partial format of an MPCM file record associated with an MSC in the MPCM file 216. This file record includes a number of fields. Some of the relevant fields are described below. The MSCID_KEY field identifies this MSC's ID (MSCID) number. It is the primary key to the MPCM files. The POINT_CODE_SSN field identifies the network ID and subsystem (SSN), etc. for this MSC. The HLR_SSN field stores the value the HLR will use as the SSN when communicating with this MSC. The IS-41 revision level of this MSC, e.g., IS-41 Rev A, IS-41 Rev B. etc, is stored in the REV_LEVEL field. Moreover, the vendor of this MSC, e.g., AT&T, Ericsson, Motorola, or Northern Telecom, etc. is identified by SWITCH_VENDOR field. Furthermore, the information of whether this MSC has a particular capability is indicated by the CAPAB_IND1 to CAPAB_INDn fields.

Figure 4:
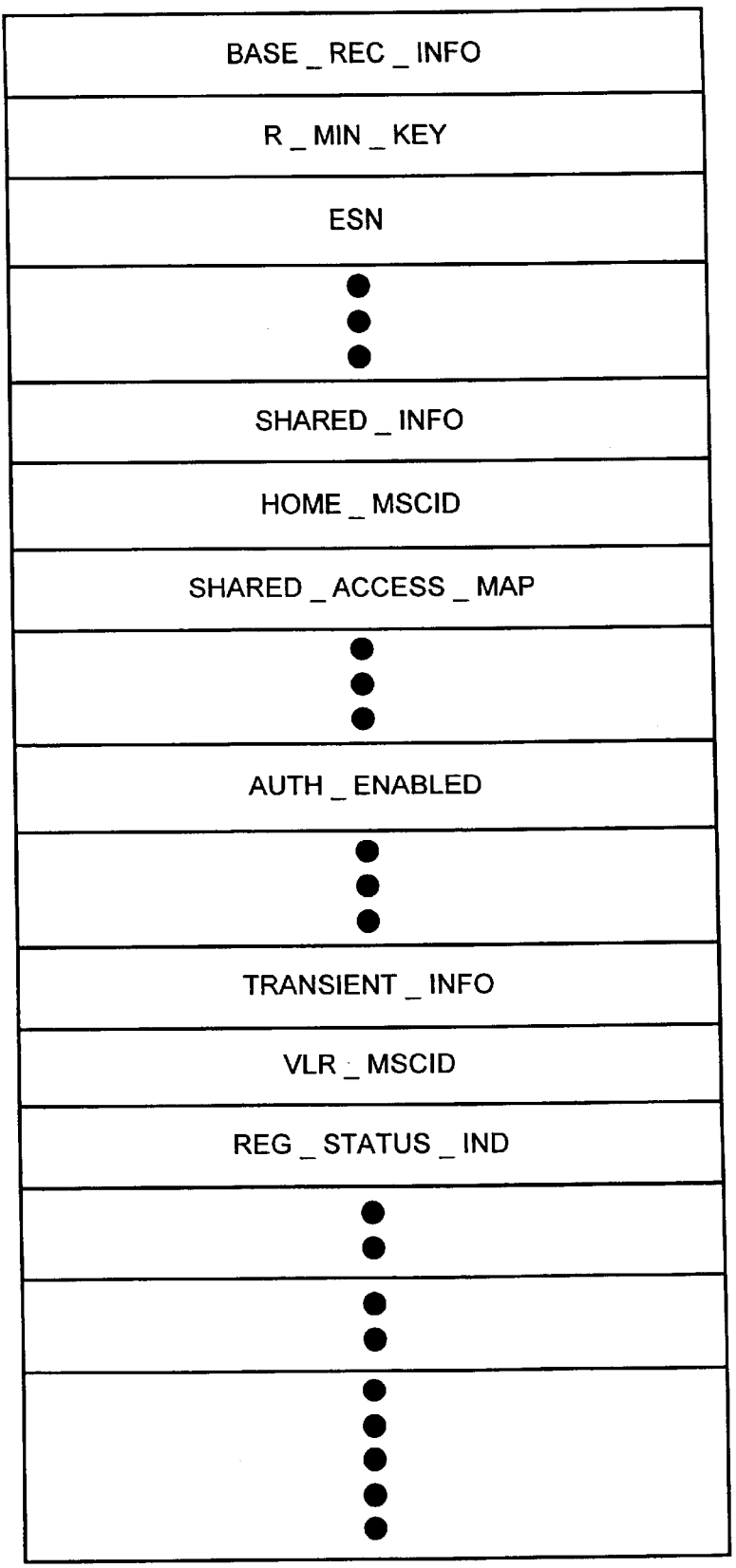
FIG. 4 shows a partial format of a subscriber's profile in a SUBS file of an HLR according to the invention.

FIG. 4 shows a partial format of a subscriber's profile in SUBS file 222.

There are several segments in each subscriber's profile record, including the BASE_REC_INFO, SHARED_INFO, TRANSIENT_INFO, etc. Each segment includes multiple fields. The BASE_REC_INFO segment contains information needed by IS-41 applications to access a subscriber record. This segment includes the R_MIN_KEY, ESN fields, etc. The R_MIN_KEY field is the subscriber file's primary key. It contains the subscriber's MIN (Mobile ID number) stored in reverse byte order. The ESN field is the subscriber file's alternate key. It contains the Equipment Ser. Number (ESN) associated with the subscriber's MIN.

The SHARED_INFO segment of a subscriber's profile record stores attributes common to the IS-41 applications.

This segment includes the HOME_MSCID, SHARED_ACCESS_MAP, AUTH_ENABLED fields, etc. The HOME_MSCID field identifies the ID number of the MSC that is in the subscribers home area. The SHARED_ACCESS_MAP field is a bitmap identifying the IS-41 applications currently accessing the subscriber's data. The AUTH_ENABLED field identifies whether or not authentication is enabled and should be performed for this subscriber.

The TRANSIENT_INFO segment of a subscribers profile stores the registration information about this subscriber. This segment includes the VLR_MSCID, REG_STATUS_IND fields, etc. The VLR_MSCID field identifies the MSCID of the VLR in a roaming area where the subscriber is currently registered. The REG_STATUS_IND field identifies the subscriber's registration status. This field stores the information relating to, e.g., whether the subscriber is registered, whether registration is active in the home area, and whether the registration is active in the roaming area.

The present invention can be best understood by the working example described below.

Figure 1:
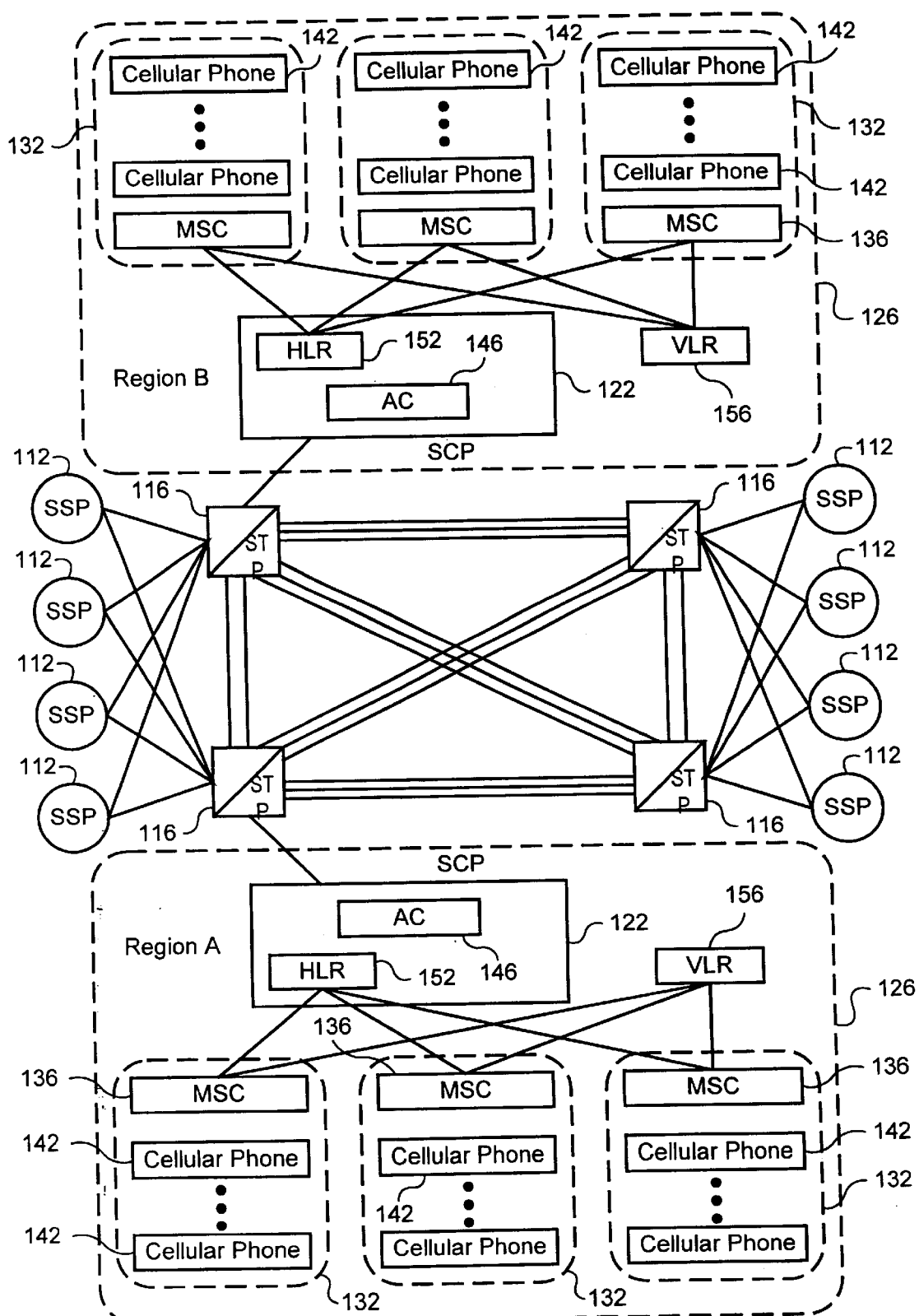
FIG. 1 depicts a typical SS7 mobile communication network.
Figure 5:
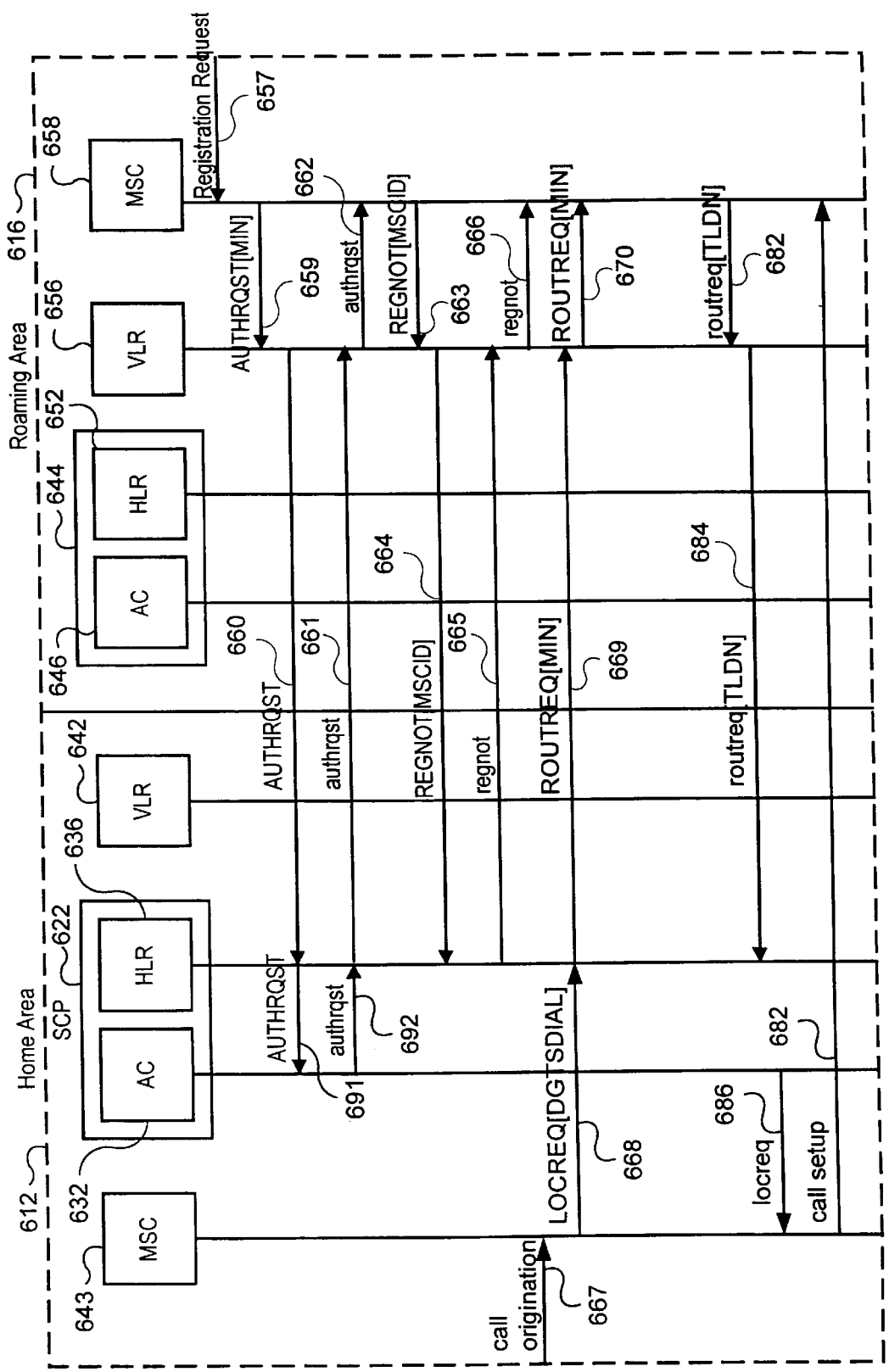
FIG. 5 shows a flow diagram illustrating a registration process and call delivery when the receiving party's cellular phone is outside its home area in a roaming area.

FIG. 5 illustrates how call delivery is made to a cellular phone that is outside its home area 612 in a roaming area 616. Home area 612 and roaming area 616 correspond to two regions, such as regions A and B, respectively, shown in FIG. 1. In home area 612, an SCP 622 and a VLR 642 are provided. SCP 622 includes an AC 632 and an HLR 636. A home MSC 643 is located in home area 612. In roaming area 616, an SCP 644 and a VLR 656 are provided. SCP 644 includes an AC 646 and an HLR 652. A serving MSC 658 is located in roaming area 616. In FIG. 5, although MSCs are shown as separate entities from the HLR and VLR in the respective areas, in a real application the HLR/VLR functions may be integrated with the MSCs.

In this example, when the subscriber enters roaming area 616, his cellular phone sends a registration request containing its MIN (Mobile ID number) to serving MSC 658, as illustrated at step 657. At step 659, serving MSC 658 sends an authentication request (AUTHRQST) message to its VLR 656 to authenticate the cellular phone. VLR 656 in turn sends the request to the subscriber's home HLR 636 in home area 612 at step 660, based on the subscriber's MIN. HLR 636 in turn sends the request to AC 632 at step 691. AC 632 then performs authentication processing and sends an authrqst response to HLR 636, at step 692, indicating whether the cellular phone is authenticated. HLR 636 in turn sends the authrqst response to VLR 656 at step 661. Assuming the cellular phone is authenticated, VLR 656 so informs serving MSC 658 at step 662. Then, serving MSC 658 sends a registration notification (REGNOT) message to its VLR 656 at step 663. VLR 656 in turn sends the REGNOT message to HLR 636 in home area 612 at step 664. In this REGNOT message, serving MSC 658 uses the SSN (subsystem number), e.g., ssn1, to communicate with HLR 636. It is often possible that different MSCs uses different SSNs in communicating with the same HLR. These SSNs are also stored in the HLR_SSN fields in the respective MPCM file records of MSCs in the MPCM file of HLR 636. Upon receiving the REGNOT message, HLR 636 updates the information in the VLR_MSCID of the subscriber's profile in the SUBS file to show new serving MSC 658 and VLR 656. Then, HLR 636 sends a regnot response back to VLR 656 at step 665, which contains relevant parts of the subscriber's profile from the SUBS file of HLR 636. VLR 656 stores the subscribers profile in its database and sends the regnot response to serving MSC 658 with the relevant parts of the subscribers profile at step 666. After step 666, the roaming subscriber is registered in this new roaming area.

When a calling party places a call to this roaming subscriber (referred to as a receiving party), as illustrated in FIG. 5, a call origination and the dialed digits are received by home MSC 643 at step 667. MSC 643 is thus also referred to as originating MSC. Then, at step 668, originating MSC 643 sends a location request (LOCREQ) message to HLR 636 in home area 612 of the receiving party. The LOCREQ message contains the dialed digits, the SSN (subsystem number), e.g., ssn2, of HLR 636 as stored in the MPCM file record associated with originating MSC 643 and other relevant information. Upon receiving the dialed digits, the switch capability mediation module of HLR 636 accesses the SUBS file in the HLR using the received dialed digits (which is typically the MIN of a cellular phone) as the key to locate the receiving party's profile.

From the HOME_MSCID and VLR_MSCID fields in the receiving party's profile record, the mediation module obtains the MSCIDs of originating MSC 643 and serving MSC 658. Using these MSCIDs as the keys, the mediation module accesses the MPCM file records of both originating MSC 643 and serving MSC 658 in the MPCM file of HLR 636. The mediation module then determines whether these two MSCs implement different capabilities by comparing the information stored in the REV_LEVEL and SWITCH_VENDOR fields in one MPCM file record against that in the other MPCM file record. In this example, it is assumed that ssn2 used by originating MSC 643 in communicating with HLR 636 is different from ssn1 used by serving MSC 658 in the MPCM file of HLR 636. The switch capability module then calls upon a mediation routine associated with this feature. The mediation routine determines, for example, that situation 3 described above is present, and thus a modification to the SSN is required. As a result, the mediation module retrieves ssn1 from the HLR_SSN field of the MPCM file record associated with serving MSC 658. Ssn1 was provided to HLR 636 by serving MSC 658 in the registration of the receiving party's cellular phone. Ssn1 will be used by HLR 636 in communicating with serving MSC 658. In this way, the communication is properly established between the two MSCs through the mediation functions performed by the mediation module in HLR 636. Other types of capabilities, e.g. CNIR (calling number ID restriction), CNIP (Calling number ID presentation), etc., of MSCs may also be mediated by the mediation module of the invention. The CNIR capability does not let the receiving party see the phone number of the calling party, whereas the CNIP capability allows the receiving party see the phone number of the calling party. Mediation can also be provided to MSCs with different IS-41 revision levels.

At step 669, HLR 636 sends a routing address request (ROUTREQ) message to VLR 656 in roaming area 616. The ROUTREQ message contains the MIN of the receiving party's cellular phone as well as ssn1 used by serving MSC 658 during the communication with HLR 636 in the registration process. VLR 656 then forwards the ROUTREQ message to serving MSC 658 at step 670. In response to the ROUTREQ message, serving MSC 658 consults its internal data structures to determine if the receiving party's cellular phone is already engaged in a call on this MSC. If the receiving party's cellular is idle, serving MSC 658 allocates a temporary identifier TLDN (Temporary Local Directory Number) and returns this information to VLR 656 in the routreq message at step 682. VLR 656 in turn sends the routreq message to HLR 636 at step 684. When the routreq message is received by HLR 636, it returns a locreq response to originating MSC 643 at step 686. The locreq response includes routing information which includes the MSCID of serving MSC 658 and the TLDN. Finally, originating MSC 643 establishes a voice path to serving MSC 658 using existing interconnection protocols (e.g., SS7) and the routing information specified in the locreq response, as illustrated at step 688. In this way, the communication between originating MSC 643 and serving MSC 658 is optimized. In the above example, if no mediation is provided by the switch capability mediation module of HLR 636, serving MSC 643 would not have recognized HLR 636 as the HLR to which it had sent a REGNOT message for the registration of the receiving party's cellular phone; thus communication would not have been properly established between originating MSC 643 and serving MSC 658.

Figure 6:
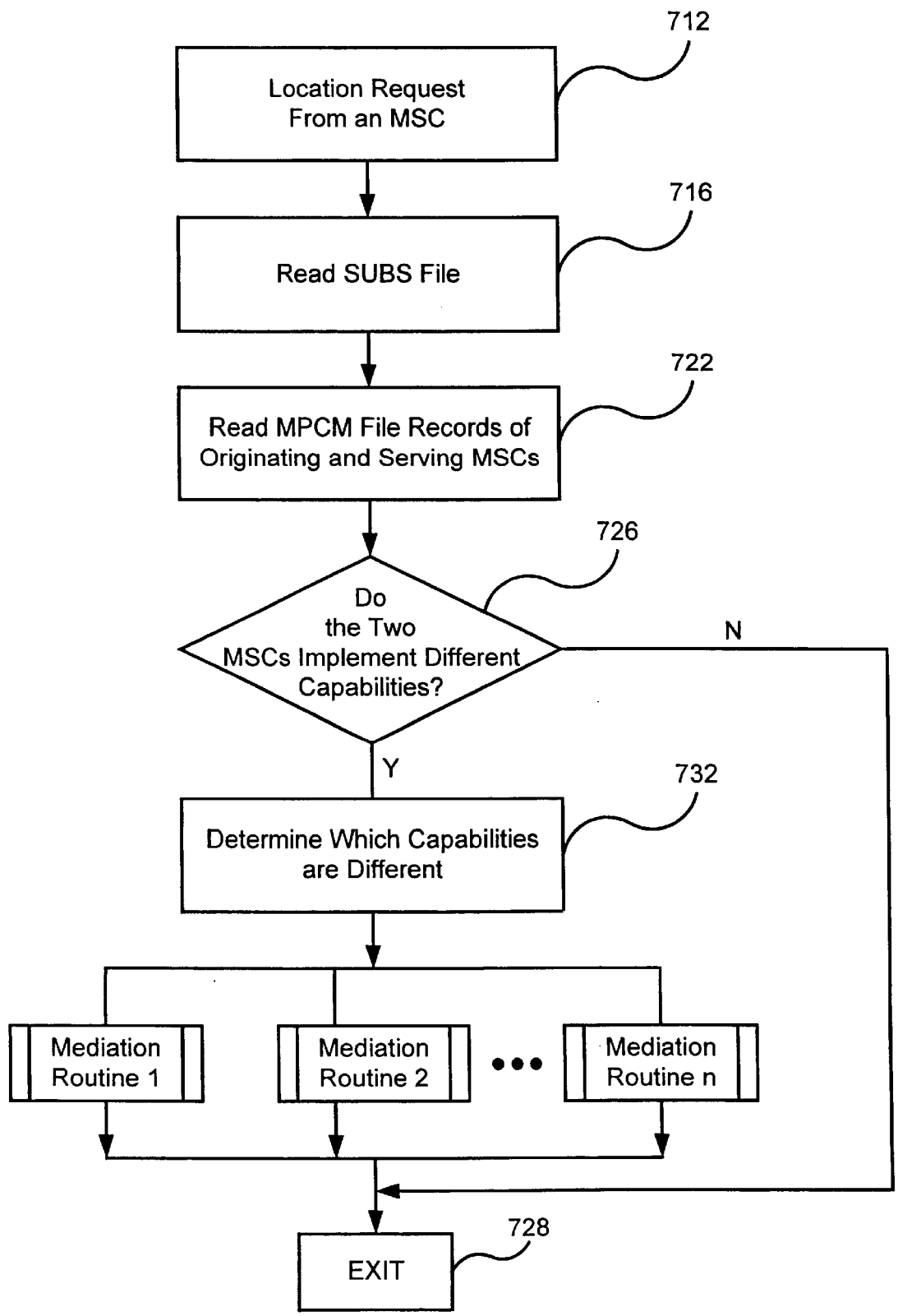
FIG. 6 shows a flow chart of the switch capability mediation module according to the invention.

FIG. 6 shows a flow chart illustrating the operation of switch capability mediation module 228 according to the invention. As described above, the home area of a subscribers cellular phone refers to the region, such as region A or B shown in FIG. 1, where the subscriber initially activates his cellular phone through a wireless service provider he has selected. In this example, assume that the subscriber has roamed out of his home area and someone attempts to place a call to this roaming subscriber. The steps of FIG. 6 are performed by HLR 636 of FIG. 5 although other HLRs are capable of performing these steps. In FIG. 6, after an origination request with the dialed digits are received by an MSC in the home area of the receiving party's cellular phone, the home MSC (also referred to as "originating MSC") sends a location request (step 668 of FIG. 5) with the dialed digits to the HLR in this home area to attempt to reach the MSC currently serving the receiving party's cellular phone, which is referred to as "serving MSC," as illustrated by step 712.

At step 716, switch capability mediation module 228 of the HLR accesses SUBS file 222 using the received dialed digits as key to locate the receiving party's profile. The dialed digits are typically the MIN of the receiving party's cellular phone. From the HOME_MSCID and VLR_MSCID fields in the receiving party's profile record in the SUBS file, the mediation module retrieves the MSCIDs of the originating MSC and serving MSC. Using these MSC-IDs as the keys, the mediation module accesses the MPCM file records of both the originating MSC and serving MSC at step 722 (both of which are stored in the MPCM file of HLR 636). At step 726, the mediation module determines whether the two MSCs have different capabilities by comparing the information stored in fields REV_LEVEL and SWITCH_VENDOR in their respective MPCM file records. If, for example, both MSCs are provided by the same vendors and the MSCs implement the same IS-41 revision, then the mediation module will do nothing and exit at step 728.

On the other hand, if the two MSCs implement different capabilities, then at step 732, the mediation module calls upon selected ones of mediation routine 1, mediation routine 2, . . . and mediation routine n based on the different capabilities implemented by the two MSCs. For example, if capability no. 1 identified by CAPAB_IND1 fields in the MPCM file records is involved, mediation routine 1 is called upon to provide mediation for this capability; and if capability no. 2 identified by CAPAB_IND2 fields in the MPCM file records is involved, mediation routine 2 is called upon to provide mediation for this capability and so on. For each capability involved, the associated mediation routine mediates between the two different MSCs in a manner depending on which of the following three situations it deals with. The three situations are: (1) the originating MSC has this particular capability, but the serving MSC does not; (2) the originating MSC does not have this capability, but the serving, MSC does; and (3) both the originating MSC and serving MSC have this capability but implement it in different ways. If both originating and serving MSCs have this capability, then the capability will be used and no mediation is needed. Similarly, if neither one of the originating and serving MSCs has the capability, the capability is not utilized.

In dealing with situation 1, the mediation routine may simply pass along the parameters associated with the particular capability to the serving MSC to let the serving MSC at least try to use this capability. In dealing with situation 2, the mediation routine may include predefined parameters associated with the particular capability in a routing message from the HLR to the serving MSC so that this particular capability of the serving MSC may be utilized. Finally, in handling situation 3, the mediation routine will attempt to make appropriate changes to the parameters relating to the particular capability of the originating MSC to those suitable to the serving MSC and then forward the modified parameters in a routing message to the serving MSC. In this way, the communication between two different MSCs can be optimized. In any of the above three situations, if the mediation routine determines that it cannot mediate between the two different MSCs, based on the particular capability involved, it may deny the call entirely. After the mediation routines have performed their respective functions, the mediation module exits at step 728.

While the invention has been described in conjunction with specific embodiments, it is evident that many alternatives, modifications and variations will be apparent to those skilled in the art in light of the foregoing description.

Accordingly, it is intended to embrace all such alternatives, modifications and variations as fall within the spirit and scope of the appended claims.

What is claimed is:

1. A method of providing switch capability mediation, in a home location register (HLR), between two mobile switching centers (MSCs), an originating MSC which receives a call origination request for reaching a subscriber and a serving MSC which is currently serving the subscriber, the method comprising the steps of:

determining whether the two MSCs implement different capabilities; and if the two MSCs implement different capabilities, providing capability mediation between the two MSCs depending on the different capabilities of the MSCs so as to optimize communication between the two MSCs.

2. The method of claim 1, wherein the step of providing capability mediation comprises the steps of:

determining, for each different capability involved, which one of the following three situations are present:

(i) the originating MSC has this capability, but the serving MSC does not, (ii) the originating MSC does not have this capability, but the serving MSC does, and (iii) both the originating and serving MSCs have this capability but implement it in different ways; and providing appropriate mediation in accordance with one of the three situations.

3. The method of claim 2, wherein the step of providing appropriate mediation comprises the steps of:

if situation (i) is present, passing along parameters associated with the capability involved;

if situation (ii) is present, providing pre-defined parameters associated with the capability involved in a routing message from the HLR to the serving MSC; and if situation (iii) is present, modifying parameters relating to the capability of the originating MSC to suitable parameters and forwarding them in the routing message from the HLR to the serving MSC.

4. The method of claim 3, further comprising the steps of:

determining, for each situation, whether mediation between the two MSCs is possible; and if mediation is not possible, denying communication between the two MSCS.

5. The method of claim 1, wherein the step of determining comprises the step of accessing MSC identification point code map (MPCM) files of the originating and serving MSCs to determine whether the two MSCs are provided by different vendors and whether they implement different capabilities.

6. A home location register (HLR) for providing switch capability mediation between two mobile switching centers (MSCs), an originating MSC which receives a call origination request for reaching a subscriber and a serving MSC which is currently serving the subscriber, the HLR comprising:

a first portion configured to determine whether the two MSCs implement different capabilities; and a second portion configured to provide capability mediation between the two MSCs depending on the different capabilities of the MSCs so as to optimize communication between the two MSCS, if the two MsCs implement different capabilities.

7. The HLR of claim 6, wherein the second portion comprises:

a first sub-portion configured to determine, for each different capability involved, which one of the following three situations are present:

(i) the originating MSC has this capability, but the serving MSC does not, (ii) the originating MSC does not have this capability, but the serving MSC does, and (iii) both the originating and serving MSCs have this capability but implement it in different ways; and a second sub-portion configured to provide appropriate mediation in accordance with one of the three situations.

8. The HLR of claim 7, wherein the second sub-portion comprises:

a first part configured to pass along parameters associated with the capability involved, if situation (i) is present;

a second part configured to provide pre-defined parameters associated with the capability involved in a routing message from the HLR to the serving MSC, if situation (ii) is present; and a third part configured to modify parameters relating to the capability of the originating MSC to suitable parameters and forward them in the routing message from the HLR to the serving MSC, if situation (iii) is present.

9. The HLR of claim 7, further comprising:

a third sub-portion configured to determine, for each situation, whether mediation between the two MSCs is possible; and a fourth sub-portion configured to deny communication between the two MSCS, if mediation is not possible.

10. The HLR of claim 6, wherein the first portion comprises a first sub-portion configured to access MSC identification point code map (MPCM) files of the originating and serving MSCs to determine whether the two MSCs are provided by different vendors and whether they implement different capabilities.

11. A home location register (HLR) for providing switch capability mediation between two mobile switching centers (MSCs), an originating MSC which receives a call origination request for reaching a subscriber and a serving MSC which is currently serving the subscriber, the HLR comprising:

a first portion configured to determine whether the two MSCs implement different capabilities based on the two MSCs' MSC identification point code map (MPCM) files;

a second portion configured to determine, for each capability involved, which of the following three situations are present, if the two MSCs implement different capabilities:

(i) the originating MSC has this capability, but the serving MSC does not, (ii) the originating MSC does not have this capability, but the serving MSC does, and (iii) both the originating and serving MSCs have this capability but implement it in different ways; and a third portion configured to pass along parameters associated with the capability involved, if situation (i) is present;

a fourth portion configured to provide pre-defined parameters associated with the capability involved in a routing message from the HLR to the serving MSC, if situation (ii) is present;

a fifth portion configured to modify parameters relating to the capability of the originating MSC to suitable parameters and forward them in the routing message from the HLR to the serving MSC, if situation (iii) is present;

a sixth portion configured to determine, for each situation, whether mediation between the two MSCs is possible; and a seventh portion configured to deny communication between the two MSCs, if mediation is not possible.

12. A computer-readable medium having stored thereon instructions which, when executed by a processor, cause the processor to provide switch capability mediation, in a home location register (HLR), between two mobile switching centers (MSCs), an originating MSC which receives a call origination request for reaching a subscriber and a serving MSC which is currently serving the subscriber, the processor performing the functions of:

determining whether the two MSCs implement different capabilities; and if the two MSCs implement different capabilities, providing capability mediation between the two MSCs depending on the different capabilities of the MSCs so as to optimize communication between the two MSCs.

optimize communication between the two MSCs.

13. The computer-readable medium of claim 12, wherein the function of providing capability mediation comprises the functions of:

determining, for each different capability involved, which one of the following three situations are present:

(i) the originating MSC has this capability, but the serving MSC does not, (ii) the originating MSC does not have this capability, but the serving MSC does, and (iii) both the originating and serving MSCs have this capability but implement it in different ways; and providing appropriate mediation in accordance with one of the three situations.

14. The computer-readable medium of claim 13, wherein the function of providing appropriate mediation comprises the functions of:

if situation (i) is present, passing along parameters associated with the capability involved;

if situation (ii) is present, providing pre-defined parameters associated with the capability involved in a routing message from the HLR to the serving MSC; and if situation (iii) is present, modifying parameters relating to the capability of the originating MSC to suitable parameters and forwarding them in the routing message from the HLR to the serving MSC.

15. The computer-readable medium of claim 14, further comprising the functions of:

determining, for each situation, whether mediation between the two MSCs is possible; and if mediation is not possible, denying communication between the two MSCS.

16. The computer-readable medium of claim 12, wherein the function of determining comprises the function of accessing MSC identification point code map (MPCM) files of the originating and serving MSCs to determine whether the two MSCs are provided by different vendors and whether they implement different capabilities.

17. A computer-readable medium having stored thereon instructions which, when executed by a processor, cause the processor to provide switch capability mediation, in a home location register (HLR), between two mobile switching centers (MSCs), wherein a first MSC is an originating MSC which receives a call origination request for reaching a subscriber and a second MSC is a serving MSC which serves the subscriber, the processor performing the functions of:

determining whether the two MSCs implement different capabilities, the determining step including the step of reading a SUBS file storing a profile record of the subscriber to retrieve an MSC identification (MSCID) of the serving MSC for accessing an MSCID point code map (MPCM) file record associated with the serving MSC; and if the two MSCs implement different capabilities, providing capability mediation between the two MSCs comprising the steps of:

determining, for each different capability involved, which one of the following three situations is present:

(i) the originating MSC has this capability, but the serving MSC does not;

(ii) the originating MSC does not have this capability, but the serving MSC does; and (iii) both the originating and serving MSCs have this capability but implement it in different ways; and providing appropriate mediation in accordance with the determined one of the three situations.

involved, which one of the following three situations is present:

(i) the originating MSC has this capability, but the serving MSC does not;

(ii) the originating MSC does not have this capability, but the serving MSC does; and (iii) both the originating and serving MSCs have this capability but implement it in different ways; and a second sub-portion configured to provide appropriate mediation in accordance with the determined one of the three situations.

* * * * *